(12) United States Patent
Ogata

(10) Patent No.: US 9,525,189 B2
(45) Date of Patent: Dec. 20, 2016

(54) ADHESIVE RESIN COMPOSITION FOR SECONDARY BATTERY

(71) Applicant: Sumitomo Chemical Company, Limited, Tokyo (JP)

(72) Inventor: Toshihiko Ogata, Osaka (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 195 days.

(21) Appl. No.: 14/347,108

(22) PCT Filed: Sep. 24, 2012

(86) PCT No.: PCT/JP2012/075274
§ 371 (c)(1),
(2) Date: Mar. 25, 2014

(87) PCT Pub. No.: WO2013/047853
PCT Pub. Date: Apr. 4, 2013

(65) Prior Publication Data
US 2014/0227603 A1    Aug. 14, 2014

(30) Foreign Application Priority Data

Sep. 26, 2011 (JP) ................. 2011-208606
Oct. 7, 2011 (JP) ................. 2011-222674
Mar. 15, 2012 (JP) ................. 2012-058385

(51) Int. Cl.
*H01M 10/04* (2006.01)
*H01M 10/02* (2006.01)
(Continued)

(52) U.S. Cl.
CPC ......... *H01M 10/02* (2013.01); *C09J 123/0853* (2013.01); *H01M 2/168* (2013.01); *H01M 10/04* (2013.01); *C08L 2201/56* (2013.01)

(58) Field of Classification Search
CPC ...... H01M 10/04; H01M 2/168; H01M 10/02; C09J 123/0853; C08L 23/0869
See application file for complete search history.

(56) References Cited

U.S. PATENT DOCUMENTS 6,024,773 A    2/2000 Inuzuka et al.
6,051,342 A    4/2000 Hamano et al.
(Continued)

FOREIGN PATENT DOCUMENTS

CN    1187210 A    7/1998
CN    1303874 A    7/2001
(Continued)

OTHER PUBLICATIONS

Office Action issued Jul. 1, 2015 in CN Application No. 201280046478.7.
(Continued)

*Primary Examiner* — Emily Le
*Assistant Examiner* — Monique Wills
(74) *Attorney, Agent, or Firm* — Panitch Schwarze Belisario & Nadel LLP

(57) ABSTRACT

An adhesive resin composition for a secondary battery for bonding a separator for a secondary battery and an electrode for a secondary battery, wherein the composition comprises an adhesive resin, the adhesive resin contains the following (A) and (B), and the phase composed of (A) and (B) has a core shell heterophase structure and/or a sea-island heterophase structure:
(A) a resin having a glass transition temperature of −30° C. to +20° C.,
(B) a resin having a glass transition temperature 20° C. to 200° C. higher than the glass transition temperature of (A).

14 Claims, 1 Drawing Sheet

(51) Int. Cl.
*H01M 2/16* (2006.01)
*C09J 123/08* (2006.01)

(56) References Cited

U.S. PATENT DOCUMENTS

| | | | |
|---|---|---|---|
| 6,224,981 B1 | 5/2001 | Richard et al. | |
| 6,468,698 B1 | 10/2002 | Hamano et al. | |
| 2002/0048704 A1* | 4/2002 | Murai | C09J 127/16 429/144 |
| 2002/0197413 A1 | 12/2002 | Daido et al. | |
| 2003/0113626 A1 | 6/2003 | Maeda et al. | |
| 2003/0157408 A1 | 8/2003 | Sun | |
| 2006/0154078 A1* | 7/2006 | Watanabe | C09J 7/0203 428/413 |
| 2007/0184340 A1 | 8/2007 | Ichikawa et al. | |
| 2009/0186962 A1* | 7/2009 | Kondo | C08G 59/184 523/351 |

FOREIGN PATENT DOCUMENTS

| | | |
|---|---|---|
| CN | 1715228 A | 1/2006 |
| CN | 101045849 A | 10/2007 |
| CN | 101173021 A | 5/2008 |
| JP | H1125989 A | 1/1999 |
| JP | H11-213981 A | 8/1999 |
| JP | 2001-118558 A | 4/2001 |
| JP | 2007-227666 A | 9/2007 |
| JP | 4127989 B2 | 7/2008 |
| JP | 2011-023186 A | 2/2011 |
| JP | 2011-054502 A | 3/2011 |
| JP | 2013-219005 A | 10/2013 |
| WO | 9839808 A1 | 9/1998 |
| WO | 9931750 A1 | 6/1999 |

OTHER PUBLICATIONS

Int'l Preliminary Report on Patentability issued Apr. 10, 2014 in Int'l Application No. PCT/JP2012/075274.
Int'l Search Report issued Oct. 30, 2012 in Int'l Application No. PCT/JP2012/075274.
Office Action issued Dec. 23, 2015 in CN Application No. 201280046478.7.
Office Action issued Mar. 1, 2016 in JP Application No. 2012210439.

* cited by examiner

ADHESIVE RESIN COMPOSITION FOR SECONDARY BATTERY

CROSS-REFERENCE TO RELATED APPLICATION

This application is a Section 371 of International Application No. PCT/JP2012/075274, filed Sep. 24, 2012, which was published in the Japanese language on Apr. 4, 2013, under International Publication No. WO 2013/047853 A1, and the disclosure of which is incorporated herein by reference.

TECHNICAL FIELD

The present invention relates to an adhesive resin composition for a secondary battery and the like.

BACKGROUND ART

As a member for a secondary battery, members obtained by laminating electrodes and separators are known (edited by Masayuki Yoshio/Akiya Ozawa "Lithium Ion Secondary Battery, second edition, —Material and Application—", Nikkan Kogyo Shimbun, Ltd., August, 2001, pp. 173-177).

SUMMARY OF THE INVENTION

Figure 1:
FIG. 1 is a sectional view showing a laminate of the present invention.

The present invention includes the following inventions.

<1> An adhesive resin composition for a secondary battery for bonding a separator for a secondary battery and an electrode for a secondary battery,
wherein the composition comprises an adhesive resin,
the adhesive resin contains the following (A) and (B), and the phase composed of (A) and (B) has a core shell heterophase structure and/or a sea-island heterophase structure:
(A) a resin having a glass transition temperature of −30° C. to +20° C.,
(B) a resin having a glass transition temperature 20° C. to 200° C. higher than the glass transition temperature of (A).

<2> The composition according to <1>, wherein the phase composed of (A) and (B) has a core shell heterophase structure.

<3> The composition according to <1> or <2>, wherein (A) is an ethylene-vinyl acetate copolymer.

<4> The composition according to any one of <1> to <3>, wherein (B) is a resin containing a unit derived from methyl methacrylate.

<5> The composition according to any one of <1> to <4>, further comprising an organic solvent and water.

<6> The composition according to any one of <1> to <5>, wherein the content of the adhesive resin is 0.001 to 30 parts by mass with respect to 100 parts by mass of the composition.

<7> The composition according to <5> or <6>, wherein the content of the organic solvent is 0.01 to 100 parts by mass with respect to 100 parts by mass of water.

<8> The composition according to any one of <5> to <7>, wherein the organic solvent is an alcohol.

<9> The composition according to <8>, wherein the alcohol is at least one alcohol selected from the group consisting of methanol, ethanol, isopropyl alcohol, 1-butanol, 2-butanol, sec-butyl alcohol, tert-butyl alcohol, ethylene glycol, propylene glycol and butanediol.

<10> A method for producing a laminate, comprising a step of applying the composition according to any one of <1> to <9> to a separator for a secondary battery or an electrode for a secondary battery.

<11> The method for producing a laminate according to <10>, wherein the applying is performed by a doctor blade method, a gravure method or a spray method.

<12> A method for producing a member for a secondary battery, comprising the following steps (a), (b) and (c):
(a) a step of applying the composition according to any one of <1> to <9> to a separator for a secondary battery, to obtain a laminate composed of an adhesive layer and the separator for a secondary battery,
(b) a step of drying the laminate obtained in step (a),
(c) a step of bonding under pressure the adhesive layer of the laminate dried in said step (b) to an electrode for a secondary battery.

<13> A method for producing a member for a secondary battery, comprising the following steps (a'), (b') and (c'):
(a') a step of applying the composition according to any one of <1> to <9> to an electrode for a secondary battery, to obtain a laminate composed of an adhesive layer and the electrode for a secondary battery,
(b') a step of drying the laminate obtained in step (a'),
(c') a step of bonding under pressure the adhesive layer of the laminate dried in said step (b') to a separator for a secondary battery.

<14> A laminate comprising an adhesive layer formed of the composition according to any one of <1> to <9>, and a separator for a secondary battery or an electrode for a secondary battery.

<15> A member for a secondary battery, comprising a separator for a secondary battery, an adhesive layer formed of the composition according to any one of <1> to <9> and an electrode for a secondary battery laminated in this order.

<16> An adhesive layer obtained from the composition according to any one of <1> to <9>.

MODES FOR CARRYING OUT THE INVENTION

The adhesive resin composition for a secondary battery of the present invention (hereinafter, referred to as composition) is a composition used for bonding a separator for a secondary battery (hereinafter, referred to as separator) and an electrode for a secondary battery (hereinafter, referred to as electrode). The composition contains an adhesive resin.

It is preferable that the composition further contains an organic solvent and water.

<Adhesive Resin>

The adhesive resin contained in the composition contains the following (A) and (B), and the phase composed of (A) and (B) has a core shell heterophase structure and/or a sea-island heterophase structure.

(A) a resin having a glass transition temperature of −30° C. to +20° C.

(B) a resin having a glass transition temperature 20° C. to 200° C. higher than the glass transition temperature of (A)

(A) includes diene polymers such as polybutadiene, polyisoprene, an isoprene-isobutylene copolymer, natural rubber, a styrene-1,3-butadiene copolymer, a styrene-isoprene copolymer, a 1,3-butadiene-isoprene-acrylonitrile copolymer, a styrene-1,3-butadiene-isoprene copolymer, a 1,3-butadiene-acrylonitrile copolymer, a styrene-acrylonitrile-1,3-butadiene-methyl methacrylate copolymer, a styrene-acrylonitrile-1,3-butadiene-itaconic acid copolymer, a styrene-acrylonitrile-1,3-butadiene-methyl methacrylate-fumaric acid copolymer, a styrene-1,3-butadiene-itaconic acid-methyl methacrylate-acrylonitrile copolymer, an acrylonitrile-1,3-butadiene-methacrylic acid-methyl methacrylate copolymer, a styrene-1,3-butadiene-itaconic acid-methyl methacrylate-acrylonitrile copolymer and a styrene-acrylonitrile-1,3-butadiene-methyl methacrylate-fumaric acid copolymer;

olefinic polymers such as an ethylene-propylene copolymer, an ethylene-propylene-diene copolymer, polystyrene, polyethylene, polypropylene, an ethylene-vinyl acetate copolymer, an ethylenic ionomer, polyvinyl alcohol, a vinyl acetate polymer, an ethylene-vinyl alcohol copolymer, chlorinated polyethylene and chlorosulfonated polyethylene;

styrenic polymers such as a styrene-ethylene-butadiene copolymer, a styrene-butadiene-propylene copolymer, a styrene-isoprene copolymer, a styrene-n-butyl acrylate-itaconic acid-methyl methacrylate-acrylonitrile copolymer, a styrene-n-butyl acrylate-itaconic acid-methyl methacrylate-acrylonitrile copolymer and block copolymers such as a styrene-butadiene block copolymer, a styrene-butadiene-styrene block copolymer, a styrene-ethylene-butylene-styrene block copolymer, a styrene-isoprene block copolymer and a styrene-ethylene-propylene-styrene block copolymer; acrylate polymers such as polybutyl acrylate, an acrylate-acrylonitrile copolymer and 2-ethylhexyl acrylate-methyl acrylate-acrylic acid-methoxypolyethylene glycol monomethacrylate;

vinyl chloride polymers such as an ethylene-vinyl chloride copolymer;

vinyl acetate polymers such as an ethylene-vinyl acetate copolymer; etc., and preferable is an ethylene-vinyl acetate copolymer. These polymers may be used singly, or two or more of them may be used in admixture.

(B) includes resins containing a unit derived from acrylic acid, methacrylic acid, an acrylate or a methacrylate; olefin polymers such as an ethylene-propylene copolymer and an ethylene-propylene-diene copolymer; styrenic polymers such as a styrene-butadiene-styrene block copolymer, a styrene-ethylene-butylene-styrene block copolymer, a styrene-isoprene block copolymer and a styrene-ethylene-propylene-styrene block copolymer; ester polymers such as a vinyl alcohol polymer, polyethylene terephthalate and polybutylene terephthalate; polyamide or polyimide polymers such as polyamide 6, polyamide 66, polyamide 11, polyamide 12, aromatic polyamide and polyimide; cellulose polymers such as carboxymethyl cellulose, carboxyethyl cellulose, ethyl cellulose, hydroxymethyl cellulose, hydroxypropyl cellulose, carboxyethylmethyl cellulose, salts of them such as ammonium salts and alkali metal salts; etc., and preferable are resins containing a unit derived from an acrylate or a methacrylate, and more preferable are resins containing a unit derived from methyl methacrylate.

The glass transition temperatures of (A) and (B) can be regulated depending on polymerization conditions such as the monomer ratio.

The glass transition temperature of (A) is −30° C. to +20° C., preferably −30° C. to +10° C., more preferably −30° C. to 0° C.

The glass transition temperature of (B) is usually 20° C. to 100° C., preferably 30° C. to 90° C., more preferably 40° C. to 80° C.

The mass ratio of (A) and (B) ((A)/(B)) is preferably in the range of 1/0.01 to 0.01/1, more preferably in the range of 1/0.05 to 0.05/1.

The core shell heterophase structure denotes a structure in which one of (A) and (B) forms a core and the other covers the periphery of the core (shell).

The sea-island heterophase structure denotes a structure in which one of (A) and (B) is a lone particle (island) and dispersed in the other (sea).

The core shell heterophase structure and the sea-island heterophase structure are formed of mutually immiscible two or more resins.

The core shell heterophase structure and the sea-island heterophase structure can be formed, for example, by mixing (A) and (B) and heating them. Heating is preferably conducted at a temperature of not lower than the melting point of the resin forming the shell (see, e.g., edited by Masato Tanaka "Key Point for Preparation of Nano Microcapsule", Techno System Co., Ltd., May, 2008, pp. 154-156).

The core shell heterophase structure and/or the sea-island heterophase structure can be formed, for example, by polymerizing a monomer as a unit of (B) so that (B) covers the periphery of (A) prepared previously (see, e.g., supervised by Shinzo Omi, Hisaya Sako, Susumu Kawase "Latest Technology of Polymer Fine Particle and Development of Use Thereof", CMC K.K., August, 1997, pp. 94-98).

The core shell heterophase structure and the sea-island heterophase structure can be confirmed by a transmission electron microscope.

It is preferable that the phase composed of (A) and (B) has a core shell heterophase structure, and it is more preferable that (A) is a core and (B) is shell in the core shell heterophase structure.

<Organic Solvent>

The organic solvent includes alcohols such as methanol, ethanol, isopropyl alcohol, 1-butanol, 2-butanol, sec-butyl alcohol, tert-butyl alcohol, ethylene glycol, propylene glycol and butanediol;

saturated aliphatic ethers such as propyl ether, isopropyl ether, butyl ether, isobutyl ether, n-amyl ether, isoamyl ether, methyl butyl ether, methyl isobutyl ether, methyl n-amyl ether, methyl isoamyl ether, ethyl propyl ether, ethyl isopropyl ether, ethyl butyl ether, ethyl isobutyl ether, ethyl n-amyl ether and ethyl isoamyl ether;

unsaturated aliphatic ethers such as allyl ether and ethyl allyl ether;

aromatic ethers such as anisole, phenetol, phenyl ether and benzyl ether;

cyclic ethers such as tetrahydrofuran, tetrahydropyran and dioxane;

ethylene glycol ethers such as ethylene glycol monomethyl ether, ethylene glycol monoethyl ether, ethylene glycol monobutyl ether, diethylene glycol monomethyl ether, diethylene glycol monoethyl ether and diethylene glycol monobutyl ether;

monocarboxylic acids such as formic acid, acetic acid, acetic anhydride, acrylic acid, citric acid, propionic acid and butyric acid;

organic acid esters such as butyl formate, amyl formate, propyl acetate, isopropyl acetate, butyl acetate, sec-butyl acetate, amyl acetate, isoamyl acetate, 2-ethylhexyl acetate, cyclohexyl acetate, butylcyclohexyl acetate, ethyl propionate, butyl propionate, amyl propionate, butyl butyrate, diethyl carbonate, diethyl oxalate, methyl lactate, ethyl lactate, butyl lactate and triethyl phosphate;
ketones such as acetone, ethyl ketone, propyl ketone, butyl ketone, methyl isopropyl ketone, methyl isobutyl ketone, diisobutyl ketone, acetylacetone, diacetone alcohol, cyclohexanone, cyclopentanone and methylcyclohexanone, cycloheptanone; dicarboxylic acids such as succinic acid, glutaric acid, adipic acid, undecanedioic acid, pyruvic acid and citraconic acid; 1,4-dioxane, furfural and N-methylpyrrolidone, and preferable are alcohols, more preferable are alcohols having 1 to 4 carbon atoms, further preferable is at least one alcohol selected from the group consisting of methanol, ethanol, isopropyl alcohol, 1-butanol, 2-butanol, sec-butyl alcohol, tert-butyl alcohol, ethylene glycol, propylene glycol and butanediol, still further preferable are isopropyl alcohol and/or 1-butanol.

<Water>

Water may be pure water, or may be tap water containing impurities.

<Other Additives>

The composition may contain additives other than the adhesive resin, the organic solvent and water, in a range not significantly lowering coatability and battery performances.

The additive includes viscosity modifiers swellable or dissolvable in water;
binder auxiliary substances;
anionic surfactants such as a sodium alkylbenzenesulfonate and an alkyl sulfosuccinate;
nonionic surfactants such as polyvinyl alcohol optionally having a sulfo group, a polyoxyethylene alkylphenyl ether, a polyoxyethylene alkyl ether, a polyoxyethylene fatty acid ester, a polyoxyethylene sorbitan fatty acid ester and a polyoxyethylene polyoxypropylene block copolymer;
water-soluble polymers such as hydroxyethyl cellulose;
ceramics such as alumina, silica and zeolite; etc.

The content of the adhesive resin is preferably 0.001 to 30 parts by mass, more preferably 0.01 to 20 parts by mass with respect to 100 parts by mass of the composition.

The content of the organic solvent is preferably 0.01 to 100 parts by mass, more preferably 0.01 to 80 parts by mass with respect to 100 parts by mass of water.

The content of other additives is usually in the range of 0 to 10 parts by mass with respect to 100 parts by mass of the composition, and it is preferable that other additives are substantially not contained.

The composition containing an organic solvent and water is usually a composition containing fine particles of an adhesive resin dispersed in an organic solvent and water. The particle size of the fine particle of the adhesive resin is preferably 0.005 to 100 μm, more preferably 0.01 to 50 μm, further preferably 0.05 to 50 μm. The particle size of the adhesive resin can be determined by removing the organic solvent and water from the composition, then, measuring the major axes and the minor axes of 100 particles by an electron microscope and averaging their values.

The composition containing an organic solvent and water can be produced by a method of mixing an adhesive resin, an organic solvent and water, if necessary, other additives, in any order, and stirring the mixture; a method of dispersing water in a molten adhesive resin, adding an organic solvent to the resultant dispersion and stirring the mixture; a method of adding water to a mixed solution of an adhesive resin and an organic solvent while stirring the mixed solution; or a method of adding an organic solvent to an emulsion containing an adhesive resin obtained by emulsion polymerization.

Emulsion polymerization is usually conducted by polymerizing a monomer as a unit of (A) and a monomer as a unit of (B) each in the presence of water, and preferably conducted by mixing a monomer and a polymerization initiator into a mixture of an emulsifier and water, and raising the temperature of the resultant mixture while stirring.

It is preferable that emulsion polymerization is conducted by a method of polymerizing a monomer as a unit of (A) until the polymerization conversion ratio of the monomer as a unit of (A) reaches usually 20 to 100%, preferably 40 to 100%, more preferably 80 to 100%, adding a monomer as a unit of (B) to a solution containing the resultant (A) and polymerizing the monomer as a unit of (B).

The emulsifier includes anionic surfactants such as a sodium alkylbenzenesulfonate and an alkyl sulfosuccinate; nonionic surfactants such as polyvinyl alcohol optionally having a sulfa group, a polyoxyethylene alkylphenyl ether, a polyoxyethylene alkyl ether, a polyoxyethylene fatty acid ester, a polyoxyethylene sorbitan fatty acid ester and a polyoxyethylene polyoxypropylene block copolymer; water-soluble polymers such as hydroxyethyl cellulose; etc.

The polymerization initiator includes ammonium persulfate, potassium persulfate, sodium persulfate, 2,2'-azobis(4-methoxy-2,4-dimethylvaleronitrile), 2,2'-azobis(2,4-dimethylvaleronitrile), 2,2'-azobis(2-methylpropionitrile) and 2,2'-azobis(2-methylbutyronitrile).

The polymerization temperature is preferably in the range of 20 to 95° C.

<Adhesive Layer>

The adhesive layer of the present invention is formed of a composition. The adhesive layer is a layer for bonding a separator and an electrode, and is a layer present between the separator and the electrode.

<Laminate>

The laminate of the present invention contains the adhesive layer of the present invention and a separator or an electrode. It is preferable that at least one outermost surface of the laminate is the adhesive layer.

The laminate can be produced by a method of pasting, as an adhesive layer, an adhesive resin formed into any shape by any method, on a separator or an electrode; or the following laminate production method. It is preferable that the laminate is produced by the following laminate production method.

<Laminate Production Method>

The laminate production method of the present invention comprises a step of applying a composition to a separator or an electrode.

(Separator)

The separator includes paper of viscose rayon, natural cellulose and the like; mixed paper obtained by paper making of fiber of cellulose, polyester and the like; electrolytic paper; craft paper; Manila paper; polyethylene nonwoven fabric, polypropylene nonwoven fabric, polyester nonwoven fabric, glass fiber, porous polyolefin (for example, porous polyethylene, porous polypropylene), porous polyester, aramid fiber, polybutylene terephthalate nonwoven fabric, para-oriented wholly aromatic polyamide, nonwoven fabric or porous membrane of a fluorine-containing resin such as polyvinylidene fluoride, polytetrafluoroethylene, a copolymer of vinylidene fluoride and propylene hexafluoride and fluorine-containing rubber; membranes of a proton conductive polymer; and the like, and preferable are electrolytic paper, paper of viscose rayon or natural cellulose, mixed paper obtained by paper making of fiber of cellulose and polyester, craft paper, Manila paper, polyethylene nonwoven fabric, polypropylene nonwoven fabric, polyester nonwoven fabric, Manila hemp sheet, glass fiber sheet and porous polyolefin.

The separator preferably has microscopic pores. The pore diameter of the microscopic pore of the separator is usually 0.01 to 10 μm. The thickness of the separator is usually 1 to 300 μm, preferably 5 to 30 μm.

The separator may be one obtained by laminating porous membranes having different porosities, and a separator composed of a porous polyolefin and a porous polyester is preferable.

The separator may be a laminated porous film obtained by laminating a porous membrane and a heat resistant layer. The membrane is preferably a porous membrane of a porous polyolefin.

The heat resistant layer includes layers containing a fluorine-based polymer such as polyvinylidene fluoride; a polyamide or polyimide polymer such as polyamide 6, polyamide 66, polyamide 11, polyamide 12, aromatic polyamide and polyimide; filler particles, and the like. The separator may have one heat resistant layer, or may have two or more heat resistant layers.

The filler particle includes inorganic particles or organic particles.

Inorganic materials contained in the inorganic particle include calcium carbonate, talc, clay, kaolin, silica, hydrotalcite, diatomaceous earth, magnesium carbonate, barium carbonate, calcium sulfate, magnesium sulfate, barium sulfate, aluminum hydroxide, magnesium hydroxide, calcium oxide, magnesium oxide, titanium oxide, alumina, mica, zeolite, glass and the like.

Organic materials contained in the organic particle include homopolymers of styrene, vinyl ketone, acrylonitrile, methyl methacrylate, ethyl methacrylate, glycidyl methacrylate, glycidyl acrylate, methyl acrylate and the like or copolymers composed of two or more of them; fluorine-based resins such as polytetrafluoroethylene, an ethylene tetrafluoride-propylene hexafluoride copolymer, an ethylene tetrafluoride-ethylene copolymer and polyvinylidene fluoride; melamine resins; urea resins; polyethylene; polypropylene; polymethacrylates and the like. Two or more kinds of fine particles or identical kind of fine particles having different particle size distributions may be mixed to give filler particles.

The heat resistant layer may contain a binder. The binder is an agent for binding filler particles mutually or binding filler particles and a heat resistant layer. As the binder, preferable are resins which are insoluble in an electrolyte of a battery and electrochemically stable in the use range of a battery.

The binder includes fluorine-based polymers such as polyvinylidene fluoride and polytetrafluoroethylene;

fluorine-containing rubbers such as a vinylidene fluoride-hexafluoropropylene-tetrafluoroethylene copolymer and an ethylene-tetrafluoroethylene copolymer; diene polymers such as polybutadiene, polyisoprene, an isoprene-isobutylene copolymer, natural rubber, a styrene-1,3-butadiene copolymer, a styrene-isoprene copolymer, a 1,3-butadiene-isoprene-acrylonitrile copolymer, a styrene-1,3-butadiene-isoprene copolymer, a 1,3-butadiene-acrylonitrile copolymer, a styrene-acrylonitrile-1,3-butadiene-methyl methacrylate copolymer, a styrene-acrylonitrile-1,3-butadiene-itaconic acid copolymer, a styrene-acrylonitrile-1,3-butadiene-methyl methacrylate-fumaric acid copolymer, a styrene-1,3-butadiene-itaconic acid-methyl methacrylate-acrylonitrile copolymer, an acrylonitrile-1,3-butadiene-methacrylic acid-methyl methacrylate copolymer, a styrene-1,3-butadiene-itaconic acid-methyl methacrylate-acrylonitrile copolymer and a styrene-acrylonitrile-1,3-butadiene-methyl methacrylate-fumaric acid copolymer;

hydrides of diene polymers;

olefin polymers such as an ethylene-propylene copolymer, an ethylene-propylene-diene copolymer, polystyrene, polyethylene, polypropylene, an ethylene-vinyl acetate copolymer, an ethylenic ionomer, polyvinyl alcohol, a vinyl acetate polymer, an ethylene-vinyl alcohol copolymer, chlorinated polyethylene, polyacrylonitrile, polyacrylic acid, polymethacrylic acid and chlorosulfonated polyethylene;

styrene polymers such as a styrene-ethylene-butadiene copolymer, a styrene-butadiene-propylene copolymer, a styrene-n-butyl acrylate-itaconic acid-methyl methacrylate-acrylonitrile copolymer and a styrene-n-butyl acrylate-itaconic acid-methyl methacrylate-acrylonitrile copolymer;

acrylate polymers such as polymethyl methacrylate, polymethyl acrylate, polyethyl acrylate, polybutyl acrylate, an acrylate-acrylonitrile copolymer and 2-ethylhexyl acrylate-methyl acrylate-acrylic acid-methoxypolyethylene glycol monomethacrylate;

ether polymers such as polyphenylene ether, polyethylene glycol, cellulose ether and poly ether amide;

sulfur-containing polymers such as polysulfone, polyether sulfone and polyphenylene sulfide;

polyamide or polyimide polymers such as polyamide 6, polyamide 66, polyamide 11, polyamide 12, aromatic polyamide and polyimide; ester polymers such as polyethylene terephthalate and polybutylene terephthalate;

cellulose polymers such as carboxymethyl cellulose, carboxyethyl cellulose, ethyl cellulose, hydroxymethyl cellulose, hydroxyethyl cellulose, hydroxypropyl cellulose and carboxyethylmethyl cellulose, ammonium salts thereof or alkali metal salts thereof;

block copolymers such as a styrene-butadiene block copolymer, a styrene-butadiene-styrene block copolymer, a styrene-ethylene-butylene-styrene block copolymer, a styrene-isoprene block copolymer and a styrene-ethylene-propylene-styrene block copolymer;

an ethylene-vinyl chloride copolymer;

an ethylene-vinyl acetate copolymer;

alginic acid, ammonium salts thereof or alkali metal salts thereof; and the like.

(Electrode)

The electrode includes a positive electrode and a negative electrode. The electrodes has a current collector, and usually, an electrode active material and, if necessary, an electrically conducting material, are applied with a binder to at least one surface of the current collector (preferably, to both surfaces thereof).

The electrode active material is preferably an active material capable of occluding and releasing a lithium ion. The electrode active material includes a positive electrode active material and a negative electrode active material.

The positive electrode active material includes metal composite oxides containing lithium and at least one metal selected from the group consisting of iron, cobalt, nickel and manganese, and the like, preferably includes $Li_xM_2O_2$ (wherein, M represents at least one transition metal, preferably at least one of Co, Mn and Ni, and $1.10>x>0.05$) and $Li_xM_2O_4$ (wherein, M represents at least one transition metal, preferably Mn, and $1.10>x>0.05$), more preferably includes $LiCoO_2$, $LiNiO_2$, $Li_xNi_yCo_{(1-y)}O_2$ (wherein, $1.10>x>0.05$, $1>y>0$), $Li_xNi_yCo_zMn_{(1-y-z)}O_2$ (wherein, $1.10>x>0.05$, $1>y>0$, $1>z>0$), $LiMn_2O_4$ and the like.

The negative electrode active material includes silicon oxides such as $SiO_2$; carbonaceous substances; metal composite oxides; and the like, preferably includes carbonaceous materials such as amorphous carbon, graphite, natural graphite, MCMB, pitch-based carbon fiber and polyacene; $A_xM_yO_2$ (wherein, A represents Li, M represents at least one selected from Co, Ni, Al, Sn and Mn, O represents an oxygen atom, and x, y and z are numbers in the range of $1.10 \geq x \geq 0.05$, $4.00 \geq y \leq 0.85$ and $5.00 \geq z \geq 1.5$, respectively), and the like.

The electrically conducting material includes electrically conductive carbons such as graphite, carbon black, acetylene black, Ketjen black and activated carbon; graphite type electrically conducting materials such as natural graphite, thermally expanded graphite, scaly graphite and expanded graphite;
carbon fibers such as vapor-grown carbon fiber;
metal fine particles or metal fibers of aluminum, nickel, copper, silver, gold and platinum;
electrically conductive metal oxides such as ruthenium oxide and titanium oxide;
electrically conductive polymers such as polyaniline, polypyrrole, polythiophene, polyacetylene and polyacene, and preferable are carbon black, acetylene black and Ketjen black.

The content of the electrically conducting material is preferably 0 to 50 parts by mass, more preferably 0 to 30 parts by mass with respect to 100 parts by mass of the electrode active material.

The material of the current collector includes current collectors composed of a metal such as nickel, aluminum, titanium, copper, gold, silver, platinum, aluminum alloy and stainless steel; current collectors formed by plasma thermal-spraying or arc thermal-spraying nickel, aluminum, zinc, copper, tin, lead or an alloy of them on a carbon material or activated carbon fiber; electrically conductive films obtained by dispersing an electrically conducting material in rubber or a resin such as a styrene-ethylene-butylene-styrene copolymer (SEBS); etc.

The binder includes the binders listed above.

(Applying Method)

The method of applying a composition to a separator or an electrode includes a method of applying approximately uniformly to the whole surface of the surface of a separator or an electrode (hereinafter, referred to as "continuous application"); and a method of applying to a part of the surface of a separator or an electrode (hereinafter, referred to as "discontinuous application").

The method of applying a composition to a separator or an electrode includes a slot die coat method, a doctor blade method, a dip method, a reverse roll method, a direct roll method, a gravure method, a kiss coat method, an extrusion method, a bead method, a curtain coat method, a dot method, a porous coat method, a slot coat method, a spray method, a spiral spray method, a summit spray method, immersion, brush coating and the like, preferably a doctor blade method, a gravure method, a kiss coat method, a curtain coat method, a dot method, a porous coat method, a slot coat method, a spray method, a spiral spray method or a summit spray method, more preferably a doctor blade method, a gravure method, a kiss coat method, a porous coat method, a spray method, a spiral spray method or a summit spray method, further preferably a doctor blade method, a gravure method or a spray method.

Continuous application is possible by any of the above-described methods. The method of carrying out discontinuous application includes a gravure method, a curtain coat method, a dot method, a porous coat method, a spray method, a spiral spray method, a summit spray method and the like.

(Drying Method)

It is preferable to further dry a laminate to remove an organic solvent and water from an adhesive layer of the laminate. The drying method includes drying with warm air, hot air or low moisture air; vacuum drying; drying by irradiation with infrared ray, far-infrared ray, electron beam or the like. The drying temperature is preferably 30 to 200° C., more preferably 40 to 100° C.

The thickness of the adhesive layer after drying is preferably 0.005 to 100 µm, more preferably 0.005 to 20 µm, further preferably 0.005 to 10 µm.

The coverage of the adhesive layer after drying is preferably 5 to 100%. The coverage of the adhesive layer denotes a proportion of the area of the adhesive layer with respect to the area of the whole applied surface of a separator or an electrode. The coverage of the adhesive layer can be determined by observing the adhesive layer using a microscope at a view field of 1 to 1000-fold.

In the case of a laminate obtained by continuous application, the coverage of the adhesive layer after drying is preferably 30 to 100%, more preferably 50 to 100%, further preferably 70 to 100%.

In the case of a laminate obtained by discontinuous application, the coverage of the adhesive layer after drying is preferably 5 to 80%, more preferably 10 to 70%, further preferably 10 to 60%.

When the thickness and the applied surface are within the above-described ranges, an increase in the internal resistance of the resultant a secondary battery can be further suppressed.

<Member for a Secondary Battery and Production Method Thereof>

The member for a secondary battery of the present invention (hereinafter, referred to as member) is a member in which an electrode and a separator adhere with a composition, and is composed of an electrode, an adhesive layer and a separator.

Figure 2:
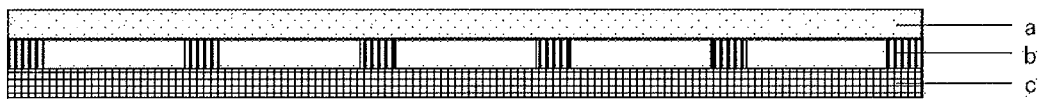
FIG. 2 is a sectional view showing a member for a secondary battery of the present invention.

The member includes a member in which only a negative electrode and a separator adhere (FIG. 2); a member in which a positive electrode and a separator adhere; a member in which a negative electrode, a separator, a positive electrode and a separator adhere repeatedly in this order (here, the negative electrode and the positive electrode are two outermost surfaces) (FIG. 3); and the like.

The first member production method includes the following steps (a), (b) and (c):

(a) a step of applying a composition to a separator, to obtain a laminate composed of an adhesive layer and the separator, (b) a step of drying the laminate obtained in step (a), (c) a step of bonding under pressure the adhesive layer of the laminate dried in said step (b) to an electrode.

The second member production method includes the following steps (a'), (b') and (c'):

(a') a step of applying a composition to an electrode, to obtain a laminate composed of an adhesive layer and the electrode, (b') a step of drying the laminate obtained in step (a'), (c') a step of bonding under pressure the adhesive layer of the laminate dried in said step (b') to a separator.

Applying and drying in (a), (b), (a') and (b') are conducted by the above-described applying method and drying method.

Bonding under pressure in (c) and (c') may conducted by bonding under positive pressure or by bonding under negative pressure.

The temperature in bonding under pressure is preferably 25° C. or higher, more preferably 30° C. to 200° C.

Figure 3:
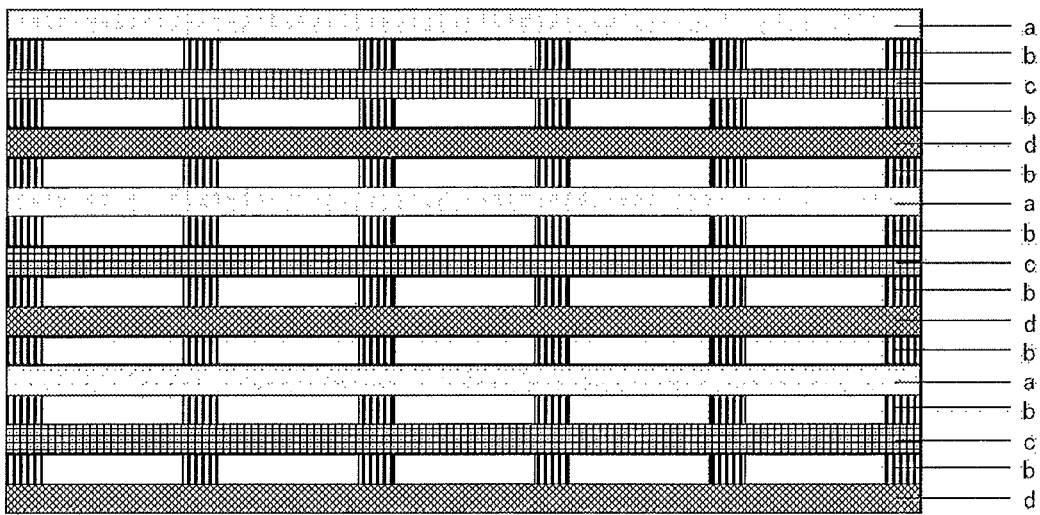
FIG. 3 is a sectional view showing a member for a secondary battery of the present invention.

The member production method shown in FIG. 3 includes a method of repeating the first production method several times; a method of repeating the second production method several times; and a method of repeating the first production method and the second production method in combination several times.

<Method of Adhesion of Electrode and Separator>

The method of adhesion of an electrode and a separator includes (a), (b) and (c) or (a'), (b') and (c').

<Use of Composition for Bonding Electrode and Separator>

Use of a composition for bonding an electrode and a separator is a use method in which (a), (b) and (c) or (a'), (b') and (c') are conducted.

<Secondary Battery>

A secondary battery having a member and an electrolyte will be illustrated. The secondary battery includes a lithium ion secondary battery. The lithium ion secondary battery is a battery in which oxidation and reduction of lithium are performed in both a positive electrode and a negative electrode, thereby storing and releasing electric energy.

(Electrolyte)

The electrolyte includes a non-aqueous electrolyte obtained by dissolving a lithium salt in an organic solvent, and the like. The lithium salt includes $LiClO_4$, $LiPF_6$, $LiAsF_6$, $LiSbF_6$, $LiBF_4$, $LiCF_3SO_3$, $LiN(SO_2CF_3)_2$, $LiC(SO_2CF_3)_3$, $Li_2B_{10}Cl_{10}$, lower aliphatic carboxylic acid lithium salts, $LiAlCl_4$ and the like, and lithium salts containing fluorine are preferable, and $LiPF_6$, $LiAsF_6$, $LiSbF_6$, $LiBF_4$, $LiCF_3SO_3$, $LiN(CF_3SO_2)_2$ and $LiC(CF_3SO_2)_3$ are more preferable.

As the organic solvent in the electrolyte, used can be made of carbonates such as propylene carbonate, ethylene carbonate, dimethyl carbonate, diethyl carbonate, ethylmethyl carbonate, 4-trifluoromethyl-1,3-dioxolan-2-one and 1,2-di(methoxycarbonyloxy)ethane; ethers such as 1,2-dimethoxyethane, 1,3-dimethoxypropane, pentafluoropropyl methyl ether, 2,2,3,3-tetrafluoropropyl difluoromethyl ether, tetrahydrofuran and 2-methyltetrahydrofuran; esters such as methyl formate, methyl acetate and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide and 1,3-propanesultone or those obtained by introducing a fluorine substituent into the above-described organic solvents, and usually, two or more of these solvents are used in admixture.

According to the composition of the present invention, adhesiveness between a separator and an electrode can be improved.

According to the composition of the present invention, workability in fabricating a secondary battery can be improved without significantly increasing the internal resistance of the resultant secondary battery.

EXAMPLES

Example 1

Production of Laminate

Two parts by mass of an adhesive resin having a core shell heterophase structure composed of a core made of an ethylene-vinyl acetate copolymer (glass transition temperature; −20° C.) and a shell made of a methyl acrylate-n-butyl acrylate copolymer (glass transition temperature; 50° C.), 20 parts by mass of isopropyl alcohol and 78 parts by mass of water were mixed. The resultant mixture was stirred at room temperature for 30 seconds at 2000 rpm using a rotation revolution mixer "Awatori Rentaro" (manufactured by Shinky Corporation; registered trademark), to obtain a composition.

The resultant composition was discontinuously applied to porous polyethylene having a thickness of 16 μm and a porosity 51% by a spray method using a handy type spray. The resultant laminate was dried at 65° C. for 5 minutes, to obtain a laminate composed of a separator and an adhesive layer.

The adhesive layer of the laminate was measured using a digital microscope (manufactured by KEYENCE K.K., VHX-500F) at a magnification of 200, to find a coverage of the adhesive layer of 22%.

Example 2

Production of Laminate

One part by mass of an adhesive resin having a core shell heterophase structure composed of a core made of an ethylene-vinyl acetate copolymer (glass transition temperature; −20° C.) and a shell made of a methyl acrylate-n-butyl acrylate copolymer (glass transition temperature; 50° C.), 0.5 parts by mass of polyoxyethylene alkyl ether, 10 parts bymass of isopropyl alcohol, 5 parts by mass of 1-butanol and 83.5 parts by mass of water were mixed. The resultant mixture was stirred at room temperature for 30 seconds at 2000 rpm using a rotation revolution mixer "Awatori Rentaro" (manufactured by Shinky Corporation; registered trademark), to obtain a composition.

The resultant composition was continuously applied to porous polyethylene having a thickness of 16 μm and a porosity 51% by a doctor blade method. The resultant laminate was dried at 65° C. for 5 minutes, to obtain a laminate composed of an adhesive layer and a separator.

The adhesive layer of the laminate was measured in the same manner as in Example 1, to find a coverage of the adhesive layer of 100%.

Example 3

Production of Laminate

One part by mass of an adhesive resin having a core shell heterophase structure composed of a core made of an ethylene-vinyl acetate copolymer (glass transition temperature; −20° C.) and a shell made of a methyl acrylate-n-butyl acrylate copolymer (glass transition temperature; 50° C.), 0.5 parts by mass of polyoxyethylene alkyl ether, 10 parts by mass of isopropyl alcohol, 5 parts by mass of 1-butanol and 83.5 parts by mass of water were mixed. The resultant mixture was stirred at room temperature for 30 seconds at 2000 rpm using a rotation revolution mixer "Awatori Rentaro" (manufactured by Shinky Corporation; registered trademark), to obtain a composition.

The resultant composition was continuously applied to porous polyethylene having a thickness of 19 μm and a porosity 54% by a gravure coater. The resultant laminate was dried at 65° C. for 5 minutes, to obtain a laminate composed of a separator and an adhesive layer.

Test Example 1

Air Resistance (Gurley)

According to JIS P8117, the air resistance of the resultant laminate and the separator used in the example (porous polyethylene having a thickness of 16 μm and a porosity of 51%) was measured.

The separator (porous polyethylene having a thickness of 16 μm and a porosity of 51%) used in Example 1 is regarded as Comparative Example 1.

The separator (porous polyethylene having a thickness of 19 μm and a porosity of 54%) used in Example 3 is regarded as Comparative Example 2.

TABLE 1

|  | air resistance [sec/100 ml] |
|---|---|
| Example 1 | 369 |
| Example 2 | 323 |
| Comparative Example 1 | 292 |

TABLE 2

|  | air resistance [sec/100 ml] |
|---|---|
| Example 3 | 214 |
| Comparative Example 2 | 190 |

When the air resistance is larger, the internal resistance of the resultant secondary battery is increased more. No significant difference was recognized between the air resistances in Examples 1 and 2 and the air resistance in Comparative Example 1. Also, between the air resistance in Example 3 and the air resistance in Comparative Example 2, no significant difference was recognized. It is estimated that even if the secondary battery composed of a separator and an electrode is compared with the secondary battery composed of a separator, an adhesive layer and an electrode, there is no significant difference in the internal resistance of the secondary battery.

Example 4

Production of Member

The adhesive layer of the laminate obtained in Example 1 and a negative electrode cut into a strip [a commercially available negative electrode produced by applying graphite/polyvinylidene fluoride (the mass ratio 100/7.5) to a copper foil] were bonded under pressure in vacuo at 60° C. for 5 minutes, to obtain a member.

Example 5

Production of Member

The adhesive layer of the laminate obtained in Example 2 and a negative electrode cut into a strip [a commercially available negative electrode produced by applying graphite/styrene-1,3-butadiene copolymer/sodium carboxymethyl cellulose (the mass ratio 100/1.5/1) to a copper foil] were bonded under pressure in vacuo at 60° C. for 5 minutes, to obtain a member.

Example 6

Production of Member

The adhesive layer of the laminate obtained in Example 2 and a positive electrode cut into a strip [a commercially available positive electrode produced by applying $LiNi_{0.3}Co_{0.3}Mn_{0.3}O_2$/carbon black/polyvinylidene fluoride (the mass ratio 93/4/3) to an aluminum foil] were thermally bonded under pressure at 70° C. using a roll type laminater (manufactured by FUJIPLA Inc., Fujilamipacker LPP6512), to obtain a member.

Example 7

Production of Member

The adhesive layer of the laminate obtained in Example 3 and a negative electrode cut into a strip [a commercially available negative electrode produced by applying graphite/styrene-1,3-butadiene copolymer/sodium carboxymethyl cellulose (the mass ratio 100/1.5/1) to a copper foil] were thermally bonded under pressure at 70° C. using a roll type laminater (manufactured by FUJIPLA Inc., Fujilamipacker LPP6512), to obtain a member.

Comparative Example 3

Porous polyethylene having a thickness of 16 μm and a porosity of 51% and a negative electrode cut into a strip [a commercially available negative electrode produced by applying graphite/polyvinylidene fluoride (the mass ratio 100/7.5) to a copper foil] were bonded under pressure in vacuo at 60° C. for 5 minutes, to obtain a member.

Comparative Example 4

Porous polyethylene having a thickness of 16 μm and a porosity of 51% and a negative electrode cut into a strip [a commercially available negative electrode produced by applying graphite/styrene-1,3-butadiene copolymer/sodium carboxymethyl cellulose (the mass ratio 100/1.5/1) to a copper foil] were bonded under pressure in vacuo at 60° C. for 5 minutes, to obtain a member.

Comparative Example 5

Porous polyethylene having a thickness of 16 μm and a porosity of 51% and a positive electrode cut into a strip [a commercially available positive electrode produced by applying $LiNi_{0.3}CO_{0.3}Mn_{0.3}O_2$/carbon black/polyvinylidene fluoride (the mass ratio 93/4/3) to an aluminum foil] were thermally bonded under pressure at 70° C. using a roll type laminater (manufactured by FUJIPLA inc., Fujilamipacker LPP6512), to obtain a member.

Comparative Example 6

Porous polyethylene having a thickness of 19 μm and a porosity of 54% and a negative electrode cut into a strip [a commercially available negative electrode produced by applying graphite/styrene-1,3-butadiene copolymer/sodium carboxymethyl cellulose (the mass ratio 100/1.5/1) to a copper foil] were thermally bonded under pressure at 70° C. using a roll type laminater (manufactured by FUJIPLA Inc., Fujilamipacker LPP6512), to obtain a member.

Test Example 2

Peeling Strength

The electrode side of the resultant member and a glass epoxy resin plate were pasted with a double-stick tape and fixed on a peeling strength measuring apparatus, and peeled toward the thickness direction using a small bench-top testing machine (manufactured by Shimadzu Corp., EZ Test EZ-L), and the magnitude of force necessary for peeling the electrode and the separator contained in the member. A value obtained by dividing the magnitude of force in this operation by the width (2 cm) of the separator was recorded as the peeling strength (N/m). The members of the examples were excellent in peeling strength. According to the members of the examples, an improvement in workability in fabricating a secondary battery can be predicted.

TABLE 3

|  | peeling strength [N/m] |
|---|---|
| Example 4 | 5 |
| Example 5 | 3 |
| Example 6 | 6 |
| Example 7 | 2 |
| Comparative Example 3 | No adhesion, and unmeasurable |
| Comparative Example 4 | No adhesion, and unmeasurable |
| Comparative Example 5 | No adhesion, and unmeasurable |
| Comparative Example 6 | No adhesion, and unmeasurable |

Example 8

Production of Laminate

The composition obtained in Example 1 is discontinuously applied to a negative electrode cut into a strip [a commercially available negative electrode produced by applying graphite/polyvinylidene fluoride (the mass ratio 100/7.5) to a copper foil] by a spray method using a handy type spray. The resultant laminate is dried, to obtain a laminate composed of an adhesive layer and the negative electrode.

Example 9

Production of Member

The adhesive layer of the laminate obtained in Example 8 and porous polyethylene having a thickness of 16 μm and a porosity of 51% are bonded under pressure in vacuo, to obtain a member. The resultant member is excellent in peeling strength.

Example 10

Production of Laminate

The composition obtained in Example 2 is continuously applied to a negative electrode cut into a strip [a commercially available negative electrode produced by applying graphite/styrene-1,3-butadiene copolymer/sodium carboxymethyl cellulose (the mass ratio 100/1.5/1) to a copper foil] by a doctor blade method. The resultant laminate is dried, to obtain a laminate composed of an adhesive layer and the negative electrode.

Example 11

Production of Member

The adhesive layer of the laminate obtained in Example 10 and porous polyethylene having a thickness of 16 μm and a porosity of 51% are bonded under pressure in vacuo, to obtain a member. The resultant member is excellent in peeling strength.

Reference Example 1

The member obtained in Example 4 is dried in vacuo, to obtain a member containing a negative electrode and a separator. In a coin cell of CR2032 type (according to IEC/JIS), the member, a lithium foil as a positive electrode, and a mixed solvent of $LiPF_6$/ethylene carbonate and diethyl carbonate having a concentration of 1.0 mol/liter as an electrolyte were used and a bipolar cell is fabricated.

Reference Example 2

A bipolar cell is fabricated in the same manner as in Reference Example 1, excepting that the member obtained in Example 5 is used instead of the member obtained in Example 4.

INDUSTRIAL APPLICABILITY

According to the adhesive resin composition for a secondary battery of the present invention, adhesiveness between a separator for a secondary battery and an electrode for a secondary battery can be improved.

EXPLANATION OF MARKS a: negative electrode
b: adhesive layer
c: separator
d: positive electrode

The invention claimed is:

1. A method for producing a laminate, comprising a step of applying an adhesive resin composition to a separator for a secondary battery or an electrode for a secondary battery,
wherein the composition comprises an adhesive resin,
the adhesive resin contains the following (A) and (B), and the phase composed of (A) and (B) has a core shell heterophase structure and/or a sea-island heterophase structure:
(A) a resin having a glass transition temperature of −30° C. to +20° C.,
(B) a resin having a glass transition temperature 20° C. to 200° C. higher than the glass transition temperature of (A).

2. The method for producing a laminate according to claim 1, wherein the applying is performed by a doctor blade method, a gravure method or a spray method.

3. A method for producing a member for a secondary battery, comprising the following steps (a), (b) and (c):
(a) a step of applying an adhesive resin composition to a separator for a secondary battery to obtain a laminate composed of an adhesive layer and the separator for a secondary battery, (b) a step of drying the laminate obtained in step (a),
(c) a step of bonding under pressure the adhesive layer of the laminate dried in said step (b) to an electrode for a secondary battery,
wherein the composition comprises an adhesive resin,
the adhesive resin contains the following (A) and (B), and the phase composed of (A) and (B) has a core shell heterophase structure and/or a sea-island heterophase structure:
(A) a resin having a glass transition temperature of −30° C. to +20° C.,
(B) a resin having a glass transition temperature 20° C. to 200° C. higher than the glass transition temperature of (A).

4. A method for producing a member for a secondary battery, comprising the following steps (a'), (b') and (c'):
(a') a step of applying an adhesive resin composition to an electrode for a secondary battery to obtain a laminate composed of an adhesive layer and the electrode for a secondary battery,
(b') a step of drying the laminate obtained in step (a'),
(c') a step of bonding under pressure the adhesive layer of the laminate dried in said step (b') to a separator for a secondary battery,
wherein the composition comprises an adhesive resin,
the adhesive resin contains the following (A) and (B), and the phase composed of (A) and (B) has a core shell heterophase structure and/or a sea-island heterophase structure:
(A) a resin having a glass transition temperature of −30° C. to +20° C.,
(B) a resin having a glass transition temperature 20° C. to 200° C. higher than the glass transition temperature of (A).

5. A laminate comprising an adhesive layer formed of an adhesive resin composition and a separator for a secondary battery or an electrode for a secondary battery,
wherein the composition comprises an adhesive resin,
the adhesive resin contains the following (A) and (B), and the phase composed of (A) and (B) has a core shell heterophase structure and/or a sea-island heterophase structure:
(A) a resin having a glass transition temperature of −30° C. to +20° C.,
(B) a resin having a glass transition temperature 20° C. to 200° C. higher than the glass transition temperature of (A).

6. A member for a secondary battery, comprising a separator for a secondary battery, an adhesive layer formed of an adhesive resin composition, and an electrode for a secondary battery laminated in this order,
wherein the composition comprises an adhesive resin,
the adhesive resin contains the following (A) and (B), and the phase composed of (A) and (B) has a core shell heterophase structure and/or a sea-island heterophase structure:
(A) a resin having a glass transition temperature of −30° C. to +20° C.,
(B) a resin having a glass transition temperature 20° C. to 200° C. higher than the glass transition temperature of (A).

7. The method according to claim 1, wherein the phase composed of (A) and (B) has a core shell heterophase structure.

8. The method according to claim 1, wherein (A) is an ethylene-vinyl acetate copolymer.

9. The method according to claim 1, wherein (B) is a resin containing a unit derived from methyl methacrylate.

10. The method according to claim 1, wherein the composition further comprises an organic solvent and water.

11. The method according to claim 1, wherein the content of the adhesive resin is 0.001 to 30 parts by mass with respect to 100 parts by mass of the composition.

12. The method according to claim 10, wherein the content of the organic solvent is 0.01 to 100 parts by mass with respect to 100 parts by mass of water.

13. The method according to claim 10, wherein the organic solvent is an alcohol.

14. The method according to claim 13, wherein the alcohol is at least one alcohol selected from the group consisting of methanol, ethanol, isopropyl alcohol, 1-butanol, 2-butanol, sec-butyl alcohol, tert-butyl alcohol, ethylene glycol, propylene glycol and butanediol.

* * * * *